(12) United States Patent
Francini et al.

(10) Patent No.: US 8,275,195 B2
(45) Date of Patent: Sep. 25, 2012

(54) METHOD FOR DETERMINING SCATTERED DISPARITY FIELDS IN STEREO VISION

(75) Inventors: Gianluca Francini, Turin (IT); Skjalg Lepsoy, Turin (IT); Giovanni Presti, Turin (IT)

(73) Assignee: Telecom Italia S.p.A., Milan (IT)

(*) Notice: Subject to any disclaimer, the term of this patent is extended or adjusted under 35 U.S.C. 154(b) by 906 days.

(21) Appl. No.: 12/085,763

(22) PCT Filed: Nov. 30, 2005

(86) PCT No.: PCT/IB2005/003598
§ 371 (c)(1),
(2), (4) Date: Feb. 3, 2009

(87) PCT Pub. No.: WO2007/063352
PCT Pub. Date: Jun. 7, 2007

(65) Prior Publication Data
US 2009/0207235 A1     Aug. 20, 2009

(51) Int. Cl.
*G06K 9/00* (2006.01)
*G07K 9/32* (2006.01)
*H04N 13/00* (2006.01)
*H04N 7/12* (2006.01)

(52) U.S. Cl. .......... 382/154; 382/106; 382/294; 348/42; 348/413.1

(58) Field of Classification Search .................. 382/154, 382/103, 195, 218, 236, 107, 260, 181, 190, 382/254, 205, 276, 284, 173, 209, 293, 294, 382/177, 179, 175, 232, 286, 291, 298, 106, 382/100; 348/E13.002, E13.003, E13.004, 348/E13.014, 47, E13.025, 42, 416.1, 413.1, 348/402.1, 46, E13.016, E13.001, E13.06, 348/E13.064, E13.065, E13.067, 48, 222.1, 348/207.99, 129, 169, E13.008, 51; 375/240.16, 375/240.17; 345/419, 418
See application file for complete search history.

(56) References Cited

U.S. PATENT DOCUMENTS 5,179,441 A * 1/1993 Anderson et al. ............... 348/43
(Continued)

FOREIGN PATENT DOCUMENTS
JP    2005-140623    6/2005

OTHER PUBLICATIONS

Tomasi, et al., "Shape and Motion from Image Streams: a Factorization Method—Part 3—Detection and Tracking of Point Features", Technical Report CMU-CS-91-132, pp. i-ii and 1-20, (Apr. 1991).

(Continued)

*Primary Examiner* — Sheela Chawan
(74) *Attorney, Agent, or Firm* — Finnegan, Henderson, Farabow, Garrett & Dunner, L.L.P.

(57) ABSTRACT

In a system for stereo vision including two cameras shooting the same scene, a method is performed for determining scattered disparity fields when the epipolar geometry is known, which includes the steps of: capturing, through the two cameras, first and second images of the scene from two different positions; selecting at least one pixel in the first image, the pixel being associated with a point of the scene and the second image containing a point also associated with the above point of the scene; and computing the displacement from the pixel to the point in the second image minimizing a cost function, such cost function including a term which depends on the difference between the first and the second image and a term which depends on the distance of the above point in the second image from a epipolar straight line, and a following check whether it belongs to an allowability area around a subset to the epipolar straight line in which the presence of the point is allowed, in order to take into account errors or uncertainties in calibrating the cameras.

11 Claims, 9 Drawing Sheets

U.S. PATENT DOCUMENTS

| | | | |
|---|---|---|---|
| 5,383,013 A * | 1/1995 | Cox | 356/2 |
| 5,432,712 A * | 7/1995 | Chan | 382/191 |
| 5,727,078 A | 3/1998 | Chupeau | |
| 7,444,013 B2 * | 10/2008 | Chen | 382/154 |
| 7,512,250 B2 * | 3/2009 | Lim et al. | 382/103 |
| 7,512,262 B2 * | 3/2009 | Criminisi et al. | 382/154 |
| 7,570,803 B2 * | 8/2009 | Criminisi et al. | 382/154 |
| 8,009,897 B2 * | 8/2011 | Xu et al. | 382/154 |
| 2002/0012459 A1 | 1/2002 | Oh | |

OTHER PUBLICATIONS

Shi, et al., "Good Features to Track", IEEE Conference on Computer Vision and Pattern Recognition (CVPR94), Seattle, pp. 1-7, (Jun. 1994).

Mendelsohn, et al., "Discrete-Time Rigidity-Constrained Optical Flow", $7^{th}$ International Conference on Computer Analysis of Images and Patterns, Kiel, Germany, pp. 1-8, (Sep. 10-12, 1997).

Najafi, et al., "Model-based Tracking with Stereovision for AR", Proceedings of the Second IEEE and ACM International Symposium on Mixed and Augmented Reality (ISMAR), pp. 1-2, (2003).

Hartley, et al., "Camera Models", Multiple Vision Geometry, Cambridge University Press, pp. 153-156 and 244 (2000).

Shen, et al., "Error Propagation from Camera Motion to Epipolar Constraint", British Machine Vision Conference, Bristol, UK, XP-002399764, pp. 1-10, (Sep. 14, 2000).

* cited by examiner

METHOD FOR DETERMINING SCATTERED DISPARITY FIELDS IN STEREO VISION

CROSS REFERENCE TO RELATED APPLICATION

This application is a national phase application based on PCT/IB2005/003598, filed Nov. 30, 2005, the content of which is incorporated herein by reference.

TECHNICAL FIELD

The present invention deals, in general, with a method for automatically analysing images for stereo vision, in particular with a method for determining scattered disparity fields when the epipolar geometry is known.

A frequent problem to be solved in automatically analysing images is determining the disparity existing between two frames showing the same scene, acquired from different points of view with one or more cameras. Disparity is related to the position of the two frames of the same scene element. There are algorithms computing the disparity for every image pixel, as well as others which are limited to a subset of pixels, namely a group of points. The former case deals with dense disparity fields, the latter case deals with scattered disparity fields. The present invention is pertaining to the second category.

A widespread technique for determining the scattered disparity field existing between two frames consists in identifying and associating related relevant points, namely points describing characteristic image areas. There are several algorithms for such purpose, which are based on identifying angles, edges, outlines or any other feature, which can be plausibly associated between frames, namely reducing the ambiguity. Such algorithms have been made for tracking points between generic frames, also taken by a single camera in different time instants.

In the "computer vision" field, there are numerous documents dealing with the problem of the search for correspondence between different frames. In particular, in stereo vision, one of the main objectives is determining the distance of portrayed objects starting from n different views, with $n \geq 2$. In case of n=2, for determining the correspondence, the so-called fundamental matrix is used, which describes the relationship existing between two images related to the same scene, taking into account the parameters describing the vision system (namely camera features and positions). Such relationship implies that, taken a point on the first image (frame), its corresponding point on the second image (frame) will lay on a straight line, called epipolar line.

One of the best known algorithms which can be used for computing a scattered disparity field, based on identifying and tracking features being present in images, is the one described in the article by Carlo Tomasi and Takeo Kanade "Shape and Motion from Image Stream—Part 3—Detection and Tracking of Point Features", Technical Report CMU-CS-91-132, April 1991, and known in the art as KLT (Kanade-Lucas-Tomasi) technique. As such article states, there are two important problems to be solved for a correct point tracking between frames: how to select the features to be tracked ("feature selection") and how to track them frame by frame ("tracking"). Such article describes in particular an algorithm for performing the tracking, through a 2×2 linear system (which can be translated in a cost function to be minimised) whose unknown is the two-dimensional displacement vector of the point feature between two frames (disparity vector).

The KLT technique, though if related to sequences of images, can be efficiently used also in case of simultaneous images of the same scene.

The article by J. Shi and C. Tomasi, "Good Features to Track", IEEE Conference on Computer Vision and Pattern Recognition (CVPR94), Seattle, June 1994, being based on the KLT technique, proposes a selection criterion of features on which tracking can be done.

The article by J. Mendelsohn, E. Simoncelli, and R. Bajcsy, "Discrete-Time Rigidity-Constrained Optical Flow", 7th International Conference on Computer Analysis of Images and Patterns, Sep. 10-12, 1997, deals with the computation of dense fields and imposes that disparity vectors (which constitute dense fields) point to positions lying on epipolar straight lines. With this constraint, it is possible to improve the results that can be obtained, if the epipolar straight lines are accurately known.

The article by H. Najafi and G. Klinker, "Model-based Tracking with Stereovision for AR", Proceedings of the Second IEEE and ACM International Symposium on Mixed and Augmented Reality (ISMAR), 2003, proposes to use the fundamental matrix downstream of the KLT technique to remove those features for which corresponding points in the second frame do not rest on epipolar straight lines. Consequently, the disparity vectors, which are in conflict with the configuration of the two cameras, are removed.

BRIEF DESCRIPTION OF THE INVENTION

The Applicant observed that the KLT technique does not exploit the fundamental matrix knowledge, which is often available above all in case of two or more cameras.

Moreover, the Applicant observed that the disparity computation techniques which exploit the fundamental matrix constrain the points to stay on the epipolar lines and that such constraint brings about correct results only assuming an accurate camera calibration. However, the calibration is typically obtained through estimations and is therefore subjected to errors or inaccuracies.

The Applicant found that, by suitably modifying the KLT method in order to take into account information pertaining to the fundamental matrix, which can be computed through a calibration process, it is possible to improve the quality of the extracted disparity field. In particular, the Applicant found that, by modifying the point tracking process in order to take into account the fundamental matrix, but without setting absolute constraints, it is possible to affect at will the process, in order to compensate for errors in calibrating the system.

In particular, the Applicant found that, by allowing the arrangement to deviate from the epipolar straight line, through the introduction, in the KLT technique cost function, of a term proportional to the square of the distance between epipolar line and searched point, it can be possible to obtain accurate results also when there is an approximate calibration. The thereby obtained results can be better both than those which can be obtained by applying the original KLT technique, and than those which can be obtained by constraining the identified points to rest only on the epipolar straight lines.

Preferably, in order to determine the point of the second image associated with the pixel of the first image, the cost function minimising step is iterated many times, using every time the update of the cost function obtained in the previous cycle.

Moreover, the Applicant found that it is possible to further limit the validity area with respect to the epipolar straight line. Such restriction is represented by a half line (subset of the epipolar straight line), which brings about the elimination of all disparity vectors which do not point to positions near such half line.

The preferred field of application of the present invention is computer vision, in particular in case of shooting from many points of view.

BRIEF DESCRIPTION OF THE FIGURES

The present invention will be described below with reference to the enclosed figures, which show a non-limiting application example thereof. In particular.

DETAILED DESCRIPTION OF THE INVENTION

Figure 1:
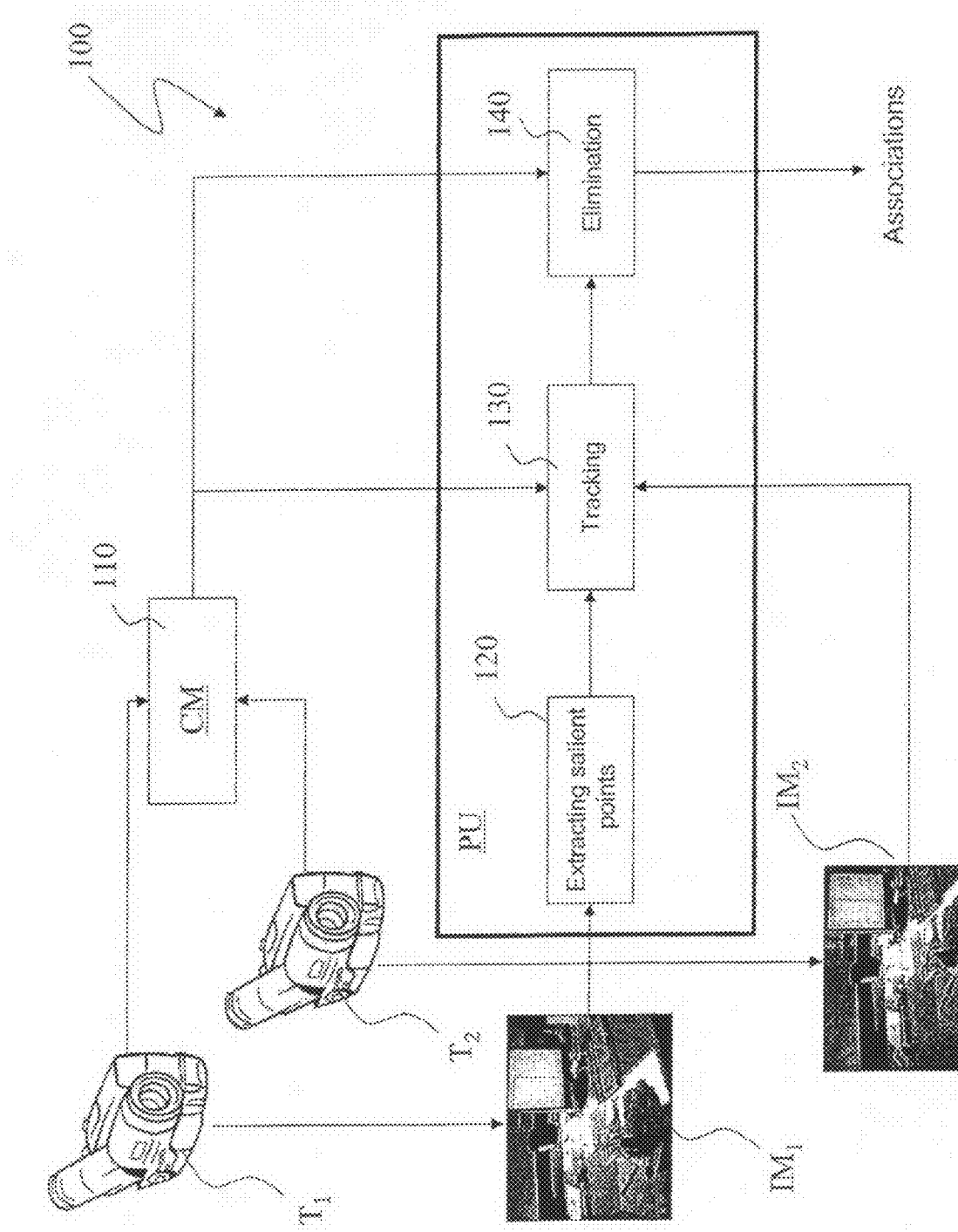
FIG. 1 schematically shows a system for video shooting comprising two cameras and blocks composing the process described in the invention.

With reference to FIG. 1, 100 designates as a whole a system for video shooting with many cameras. In particular, the system 100 is capable to shoot from different positions of the same scene and to determine the scattered disparity fields between the thereby shot images.

The system 100 comprises a first camera $T_1$ and a second camera $T_2$, both capable to generate respective digital images (or frames) $IM_1$, $IM_2$ of the same scene. The two cameras $T_1$, $T_2$ can be oriented towards the scene as mutually parallel or mutually slanted.

The system 100 further comprises a processing unit PU, connected to both cameras $T_1$, $T_2$, and capable to process digital images $IM_1$ and $IM_2$ received from the two cameras $T_1$, $T_2$ to obtain a scattered disparity field according to the method described below. Moreover, the system 100 comprises a camera calibration module CM, preferably a software module being present in the processing unit, or in a separate unit, capable to supply the processing unit with calibration data, to be used for the processing according to the inventive method.

The relationship existing between two simultaneous images of the same scene is similar to the relationship existing in a sequence of consecutive images taken by a single camera. The problem of determining the displacement of image features can therefore be solved referring to the KLT tracking technique, with a choice of features as suggested by Shi and Tomasi in the previously mentioned article.

A sequence of images can be represented with a function $F(x,y,t)$ in which F designates the intensity (scalar one in monochrome case), x and y are the space coordinates (position in the frame) and t is the time. A common approximation, on which the KLT technique is also based, expresses the image variation, between times t and t+τ only as space distortion $$F(x,y,t)=F(x+u(x,y),y+v(x,y),t+\tau) \quad (1)$$

where u(x,y) and v(x,y) are the displacement amounts in the two space directions. Formula (1) is known in literature as "brightness change constraint equation" (BCCE).

This means that an image in time t+τ can be obtained by moving every image point in time t by a suitable amount, called displacement. By knowing the displacement of every pixel in an image, it is possible to build the disparity field of the image itself, namely a set of vectors which, applied to the relevant frame, allow building the frame in the other time.

In practice, the BCCE is not exactly observed. Suffice it to think about partially hidden objects in one of the images: such objects do not "move" from one frame to the following, but simply appear or disappear. The same problem can be found on the image edges, in which objects go in or out of the scene. In any case, the KLT technique takes into account some features and not all pixels, and for the features it is possible to obtain an estimation of the BCCE correctness downstream of the displacement computation.

The technique of the present invention computes the disparity field existing between two (or more) frames independently for different features belonging to the scene, which therefore produce a scattered field.

Briefly, as shown in FIG. 1, the method of the present invention comprises the following steps, which will be described more in detail as follows:

calibrating the cameras $T_1$, $T_2$, by computing intrinsic parameters (such as focal length and projection centre) and extrinsic parameters (roto-translation matrix) of the same (block 110);

extracting features of the image $IM_1$ (block 120);

tracking features on the second image $IM_2$, taking into account the calibration parameters (block 130); and removing from computation the points which do not fall within allowability areas in the second image $IM_2$, defined below (block 140);

The removing step must be deemed as preferred but not mandatory in the method of the present invention. The method outputs are the matches between features of the first image $IM_1$ and corresponding points of the second image $IM_2$.

As already previously stated, the problem of computing the scattered disparity field can be divided into two parts; how to choose objects to be tracked, namely image features, and how to track chosen objects. The present invention affects the tracking operation.

The above function F for the two time instants t and t+τ can be expressed as two functions I and J in the following way:

$$I(x)=F(x,y,t) \quad (2)$$

and $$J(x+d)=F(x+u,y+v,t+\tau) \quad (3)$$

where d is a displacement vector associated with the pixel with coordinates x=(x,y) and containing the two components u and v. By inserting this replacement, it is possible to rewrite the BCCE expressed by equation (1) in the following way:

$$I(x)=J(x+d). \quad (4)$$

Since the method is applied independently on every selected point, it is possible to take into account a window of pixels W, centered on the object whose movement has to be computed (namely on pixel x). Equation (4), in window W, is valid apart from a residual error which can be expressed as:

$$\varepsilon = \int_W [I(x) - J(x+d)]^2 \, dx. \quad (5)$$

The optimum displacement vector d is obtained by minimising the error in equation (5). Equation (5) is not linear, and to solve it, it is preferable to transform it into a linear one. This is possible when the displacement vector d is small, by using the Taylor approximation truncated at its first order:

$$J(x+d) = J(x) + g^T d \quad (6)$$

where g is the gradient of function J evaluated in x=(x,y), $$g(x) = \vec{\nabla} J(x). \quad (7)$$

By making equation (6) discrete for all pixels falling within window W, the following system of equations is obtained:

$$\begin{cases} J_x(p_1)u + J_y(p_1)v = I(p_1) - J(p_1) \\ \vdots \qquad \qquad \vdots \\ J_x(p_N)u + J_y(p_N)v = I(p_N) - J(p_N) \end{cases} \quad (8)$$

where $J_x(p_n)$ and $J_y(p_n)$ are the two elements of the gradient vector in the generic pixel $p_n$ and N is the number of pixels contained in window W.

The system (8) can be expressed in matrix form in the following way:

$$\begin{bmatrix} J_x(p_1) & J_y(p_1) \\ \vdots & \vdots \\ J_x(p_N) & J_y(p_N) \end{bmatrix} \begin{bmatrix} u \\ v \end{bmatrix} = \begin{bmatrix} I(p_1) - J(p_1) \\ \vdots \\ I(p_N) - J(p_N) \end{bmatrix}. \quad (9)$$

Equation (9) can be rewritten in the compact form Ad=b. Matrix A is composed of brightness gradients of the second frame in pixels which fall within the applied window. Vector b is composed of brightness differences between pixels of the two frames in the same window. Vector d is the displacement to be computed. It can be appreciated that the displacement is not necessarily towards a pixel (having therefore discrete coordinates) but more generically towards a point of the second image, which could also be intermediate between two adjacent pixels.

It can be advantageous to assign a relative importance to every pixel belonging to a window, by multiplying each equation by a weight, in the following way:

$$VAd = Vb \quad (10)$$

where $$V = \begin{bmatrix} w_1 & & \\ & \ddots & \\ & & w_N \end{bmatrix}.$$

The weight assigned to the generic pixel $p_n$ is therefore equal to $w_n$. The weights are used to give greater importance to pixels being present at the window centre.

The system is over-determined, since it is composed of N equations (N>2) and two unknowns and can be solved through normal equations representing the minimum square approximation:

$$A^T W A d = A^T W b \Rightarrow G d = e \quad (11)$$

in which
$W = V^T V$,
$G = A^T W A$,
$e = A^T W b$.

The KLT technique further comprises a criterion for choosing points to be tracked. Such choice can be made with a known technique, for example according to the teaching of Shi-Tomasi. The chosen criterion must anyway guarantee the invertibility of matrix G.

All previously stated remarks are also valid for a pair of frames showing the same scene and which are simultaneously taken, like frames $IM_1$ and $IM_2$ in FIG. 1. In this case, in fact, the two functions I and J are associated with the first image $IM_1$ and the second image $IM_2$, respectively. A necessary condition so that the two frames $IM_1$, $IM_2$ can satisfy equation (1) is that the two cameras $T_1$, $T_2$ are placed one near enough to the other and that they shoot the same scene portion.

The relationship between two shootings of the same scene is expressed through the epipolar geometry. Every element in the scene, which is visible in both shootings is projected in the two frames $IM_1$, $IM_2$ in positions which comply with a simple equation. The coefficients of such equation are contained in the fundamental matrix F, composed of 3×3 elements. The positions of projections in the two frames, specified in homogeneous coordinates, are $$m_1 = \begin{bmatrix} x_1 \\ y_1 \\ 1 \end{bmatrix}$$

and $$m_2 = \begin{bmatrix} x_2 \\ y_2 \\ 1 \end{bmatrix},$$

in which $x_1$, $y_1$, $x_2$, $y_2$ are the coordinates of the two pixels in the two frames showing the shot element. The coordinates must comply with the equation $$m_2^T F m_1 = 0. \quad (12)$$

Therefore, given a point $m_1$ in the first one of the two frames, point $m_2$ in the second frame must reside on a straight line whose coefficients are determined by product $Fm_1$. Symmetrically, given a point $m_2$ in the second frame, point $m_1$ resides on the straight line with coefficients contained in product $m_2^T F$. These straight lines are called epipolar. These relationships compose the epipolar geometry, which is completely represented by the fundamental matrix F.

In the present specification, both intrinsic and extrinsic camera calibration parameters, which determine the fundamental matrix, are supposed known. However, the Applicant observed that, since calibration can be affected by estimation errors, it can be incorrect to use information provided thereby as an absolute constraint.

In order to associate information deriving from the knowledge of the calibration parameters, it is useful to interpret the KLT technique as a minimisation of a certain function obtained from equation (9). This equation is over-determined and can be solved by a least squares approximation; its solution corresponds to finding the minimum of the so-called residue norm, given by Ad-b. It is therefore possible to re-state the previously described problem in the following way:

$$d = \arg\min \|Ad-b\|^2, \quad (13)$$

namely as a cost function to be minimised. Taking into account the weights introduced in equation (10), equation (13) becomes $$d = \arg\min \|Gd-e\|^2. \quad (14)$$

In practice, it occurs that the thereby obtained vector is not always correct, namely it does not always correspond with the displacement of objects from one frame to the other. For example, this can occur when the linear approximation, on which the KLT algorithm is based, is not valid.

In case of two cameras, it is possible to take into account information related to calibration, and therefore to improve the results. The epipolar geometry provides indications about the area in the second frame in which the feature has to be searched for computing the displacement vector d.

The present invention exploits calibration data by translating them into a constraint to be added to those already contained in equation (14). The constraint is translated into a cost term linked to the epipolar information. If the geometry is exactly known, the searched point should lie on the epipolar straight line. Taking into account that calibration is obtained through estimations, and therefore it is subjected to errors or inaccuracies, it is more appropriate to assign a valence related to calibration information. Consequently, it is necessary to allow that the solution deviates from the epipolar straight line, and this is obtained in the present invention by introducing a term in the cost function (14), proportional to the square of the distance between the epipolar line and the searched point.

Equation (14) therefore assumes the form $$d = \arg\min\{\|Gd-e\|^2 + \lambda^2 \rho(z+d,L)^2\}, \quad (15)$$

where $\rho$ is a function expressing the Euclidean distance between point $z+d$, namely point $z=[x\ y]^T$ translated by amount $d=[u\ v]T$, and L, namely the epipolar straight line associated with point z. The $\lambda$ factor must be established beforehand and can be determined heuristically, also depending on the reliability assigned to the fundamental matrix. The higher the value of $\lambda$, the more the fundamental matrix correctness is relied upon. $\lambda$ can be increased until it constrains de facto the solution to lie onto the epipolar straight line.

The epipolar straight line is obtained through the fundamental matrix F. Within the second frame, the distance of the straight line from point $z+d$ can be expressed as $$\rho(z+d, L) = \frac{a(x+u) + b(y+v) + c}{\sqrt{a^2+b^2}}, \quad (16)$$

where coefficients a, b and c are given by product $$\begin{bmatrix} a \\ b \\ c \end{bmatrix} = F_z, \quad (17)$$

so that any point $m = [x_m\ y_m\ 1]^T$ on the line complies with equation $$ax_m + by_m + c = 0.$$

The solution to equation (15) can be obtained through normal equations $$\begin{bmatrix} G \\ \lambda p^T \end{bmatrix}^T \begin{bmatrix} G \\ \lambda p^T \end{bmatrix} d = \begin{bmatrix} G \\ \lambda p^T \end{bmatrix}^T \begin{bmatrix} e \\ \lambda r \end{bmatrix}, \quad (18)$$

where vectors p and r are defined as $$p = \frac{1}{\sqrt{a^2+b^2}} \begin{bmatrix} a \\ b \end{bmatrix} \quad (19)$$

and $$r = \frac{-(ax+by+c)}{\sqrt{a^2+b^2}}. \quad (20)$$

Equations (11) and (14) can be extended to obtain a more accurate result through an iterative computation which provides, at every step, an update of the Taylor series. In this case, the disparity vector is composed of many terms. At every step, a term is added, and the final solution can be expressed as $$d = \sum_{m=1}^{K} d_m, \quad (21)$$

where every term is a vector $$d_m = \begin{bmatrix} u_m \\ v_m \end{bmatrix} \quad (22)$$

Equation (9) in step number M becomes $$\begin{bmatrix} J_x\left(p_1 + \sum_{m=1}^{M-1} d_m\right) & J_y\left(p_1 + \sum_{m=1}^{M-1} d_m\right) \\ \vdots & \vdots \\ J_x\left(p_N + \sum_{m=1}^{M-1} d_m\right) & J_y\left(p_N + \sum_{m=1}^{M-1} d_m\right) \end{bmatrix} \begin{bmatrix} u_m \\ v_m \end{bmatrix} = \begin{bmatrix} I(p_1) - J\left(p_1 + \sum_{m=1}^{M-1} d_m\right) \\ \vdots \\ I(p_N) - J\left(p_N + \sum_{m=1}^{M-1} d_m\right) \end{bmatrix} \quad (23)$$

or, more compactly $$A_{M-1} d_M = b_{M-1}. \quad (24)$$

Consequently, equation (11) becomes, at iteration number M $$A_{M-1}{}^T W A_{M-1} d_M = A_{M-1}{}^T W b_{M-1}$$

$$\Downarrow$$

$$G_{M-1} d_M = e_{M-1} \quad (25)$$

The iteration is initialised at M=1, with $d_0=0$. The total number of iterations can be set beforehand or determined depending on the norm of the last added term.

Normal equations (18) providing the solution to equation (15) can be adapted to the above iterative process, through a modification to vector r, described in equation (20). Such vector will assume the form $$r = \frac{-\left(a\left(x+\sum_{m=1}^{M-1} u_m\right)+b\left(y+\sum_{m=1}^{M-1} v_m\right)+c\right)}{\sqrt{a^2+b^2}},\qquad(26)$$

at iteration number M.

The process so far described adds information about the displacement vector direction, which has to be computed, namely that equation (15) produces displacement vectors, which agree with the epipolar geometry. However, this cannot be enough to correctly characterise the vector itself, since the constraint on the epipolar straight line leaves a degree of freedom. This degree of freedom derives from the fact that the second term in equation (15) takes the solution towards the epipolar straight line but not necessarily towards the real feature position in the second frame. It is possible to reduce such problem by introducing an allowability area of the epipolar straight line and therefore transforming it into a half line.

Figure 2:
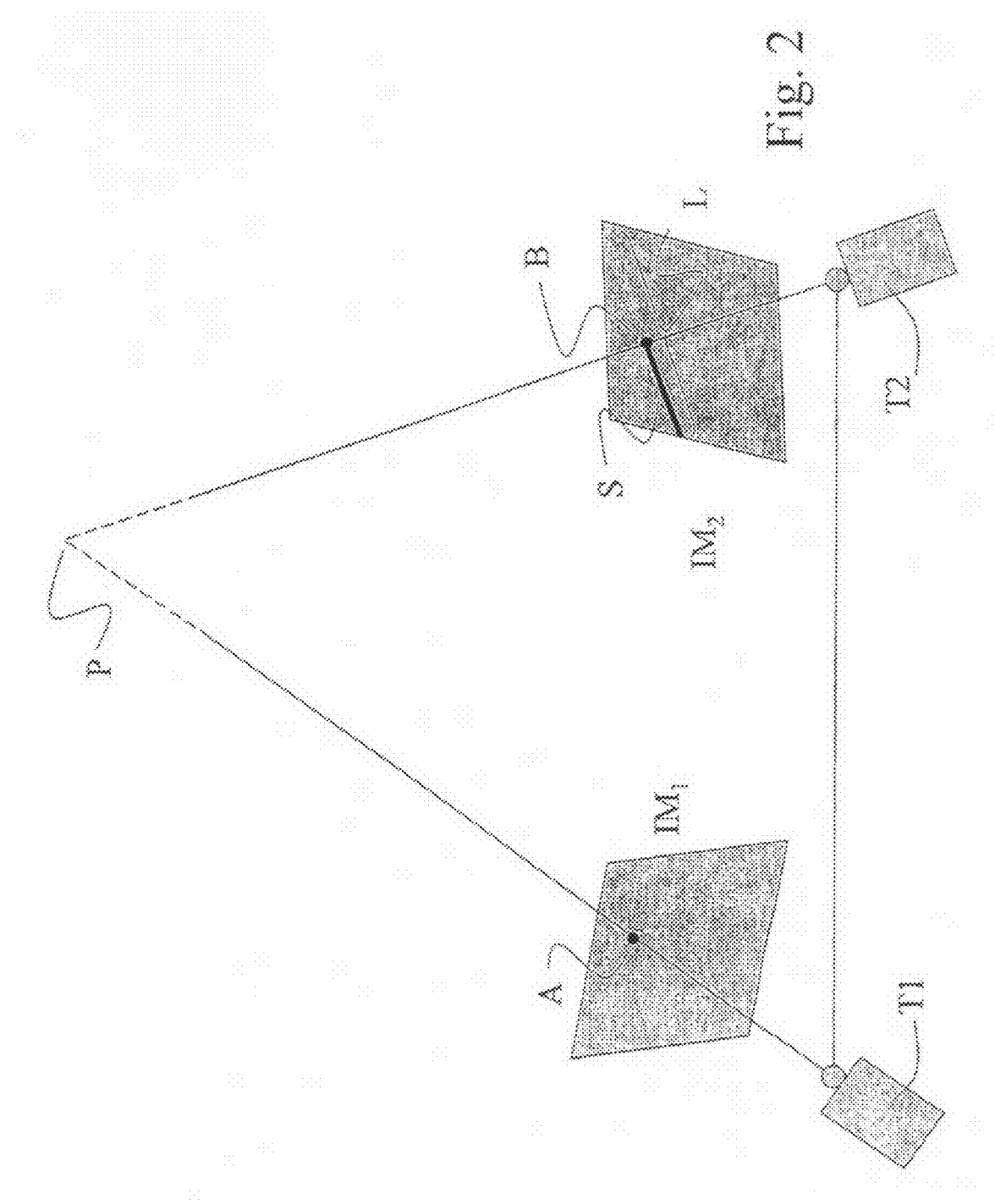
FIG. 2 schematically shows images taken by the two cameras, pointing out on one of them the epipolar line associated to a pixel of the other image.

This check is based on the fact that, with reference to FIG. 2, it is possible to associate to feature A in the first frame $IM_1$ a point P, which can be found at an infinite distance in the taken scene. Therefore, a point B can be located on the epipolar straight line L, associated with the second frame $IM_2$, which is the projection of point P. Since any object of the scene, which is projected on point A lies on half line AP, the projection of such object in the second frame must lie on half line S, which is the projection of half line AP. Such half line is therefore a subset of the epipolar straight line.

Figure 3:
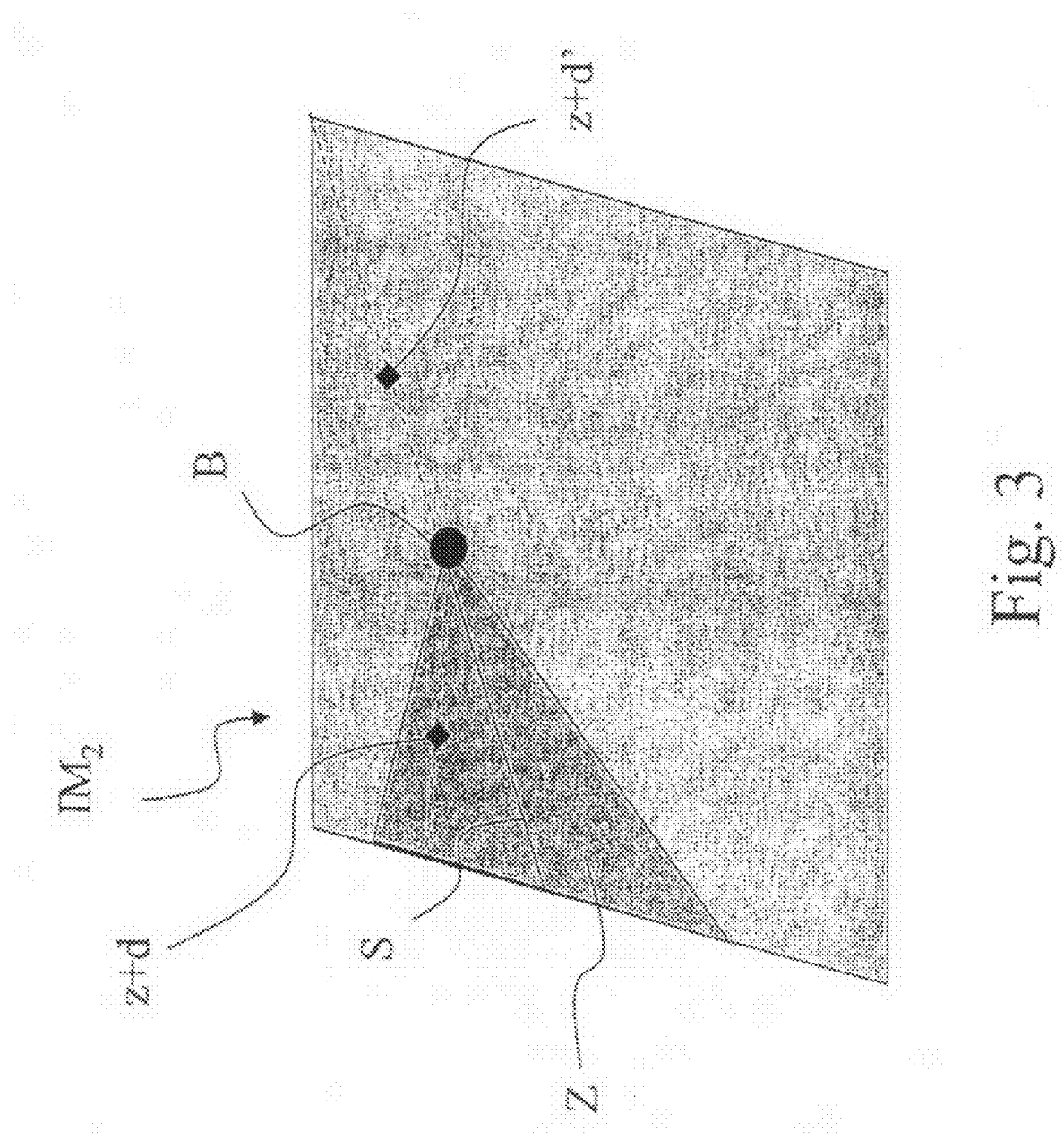
FIG. 3 shows the above image pointing out the above epipolar line and an allowability area for disparity vectors.

Taking into account the possibility of deviating from the epipolar straight line, due to the uncertain calibration reliability, the allowable subset can be extended to an allowability area Z containing half line S, with point B as vertex, as can be seen in FIG. 3.

Depending on such observations, it is possible to carry out a check, which allows efficiently removing the displacement vectors, which are not complying with the scene geometry. The check, useful in cases in which point B is within the second frame $IM_2$, allows thereby removing all candidates {z,d} (feature and displacement vector) for which point z+d does not lie within the allowability area Z. Area Z can have different shapes. It is necessary that Z is a subset of the plane, delimited by a curve passing by point B o next to it, and which contains half line S.

Half line S can be expressed as follows:

$$S=\{B+\kappa\cdot\vec{e}:\kappa\geq 0\},\qquad(27)$$

where K is a non-negative factor and $\vec{e}$ is a directional vector parallel to the epipolar straight line.

The elements, which are used for defining the half line S, can be obtained through knowledge of the camera calibration parameters. Among them, the intrinsic parameters of the two cameras are contained in matrices $K_1$ and $K_2$, while the rotation matrix and the translation vector (extrinsic parameters) associated with the second machine are called R and t. For more details, refer to the text by Richard Hartley and Andrew Zisserman, *Multiple Vision Geometry*, Cambridge University Press, 2000, on pages 153-156 and 244. Matrix R and vector t transform the system of coordinates belonging to the second camera into the one belonging to the fist. Feature A in the first frame can be expressed in homogeneous coordinates:

$$A=\begin{bmatrix}x\\y\\1\end{bmatrix}.$$

Point B (projection of the point P that resides at infinity) can be expressed through A and calibration parameters as:

$$B=K_2\frac{Rw}{R_3w},\qquad(28)$$

where $R_3$ denotes the third row of the rotation matrix R. Vector w is obtained from point A as $$w=\frac{K_1^{-1}A}{\|K_1^{-1}A\|}.\qquad(29)$$

The directional vector $\vec{e}$ can be expressed as $$\vec{e}=K_2((R_3w)t-t_3Rw),\qquad(30)$$

where $t_3$ is the third element of the translation vector t.

As an example, the allowability area can be defined in the following way, with reference to FIG. 3. The position of the point whose correctness has to be verified is given by the sum z+d. The point belongs to the allowability area if the half line starting from B and crossing z+d makes an angle with half line S which is less than a certain threshold. In this case, the check whether it belongs is expressed in vector terms in verifying the following relationship $$\frac{(z+d-B)^T\vec{e}}{\|z+d-B\|\|\vec{e}\|}\geq\theta,\qquad(31)$$

in which an inner product between standardised vectors exceeds a threshold $\theta\in[0,1]$, to be set. The minimum threshold value is 0, in which case the allowability area is the half plane delimited by the straight line perpendicular to the epipolar straight line in point B and which contains half line S. The more the threshold value increases towards value 1, the more the allowability area gets restricted. FIG. 3 shows an allowability area corresponding to an intermediate threshold value between 0 and 1, and an example of unacceptable point z+d' is shown, depending on the above criterion.

As output from the processing unit PU, as result of the above processing, associations are obtained between features extracted from the first frame $IM_1$ and corresponding points found in the second frame $IM_2$ and therefore displacement vectors d linked to the points themselves.

Figure 4:
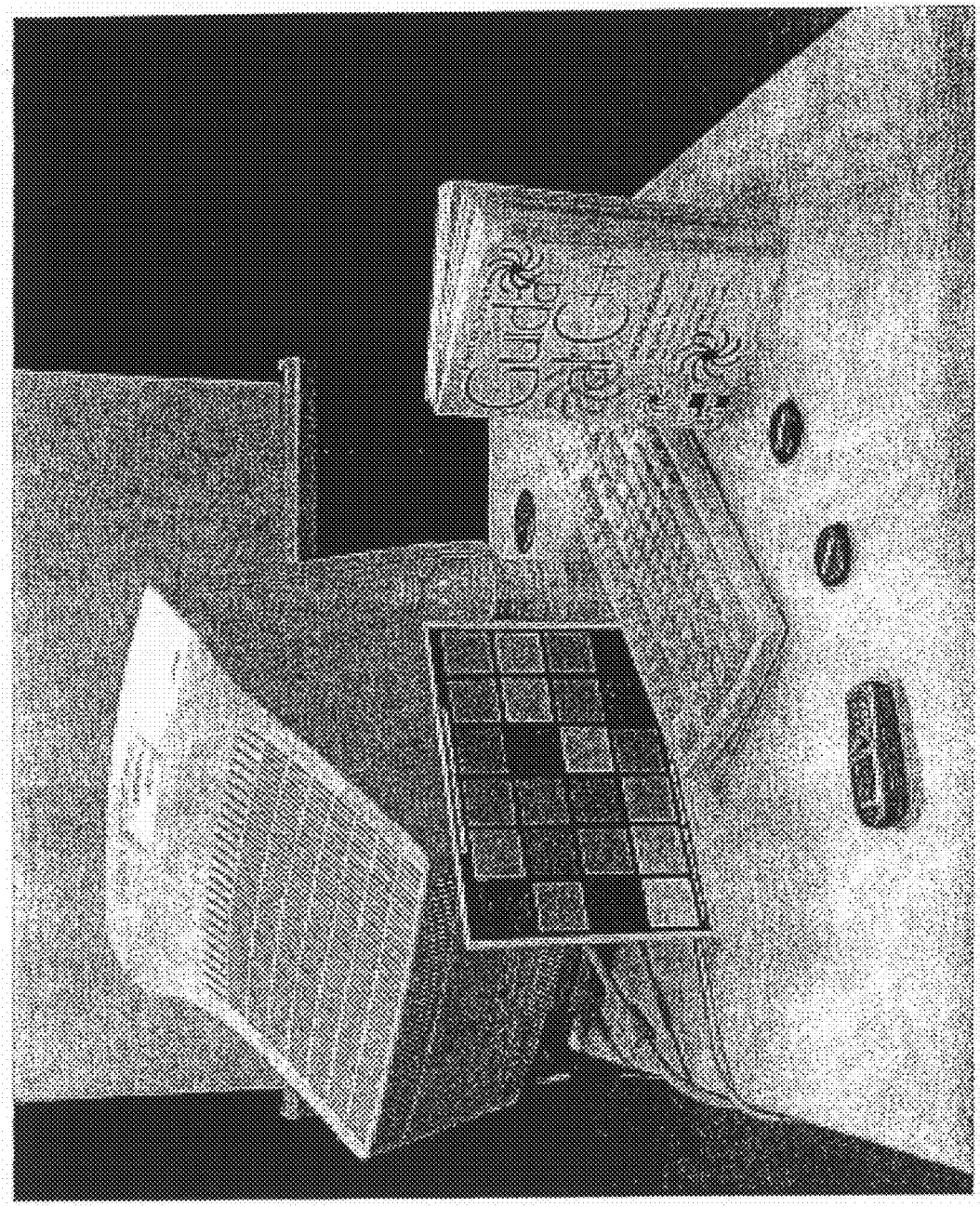
FIGS. 4 and 5 show a pair of frames of the same scene taken from different angles, for a comparative test between the inventive technique and the KLT technique carried out in the original way.
Figure 5:
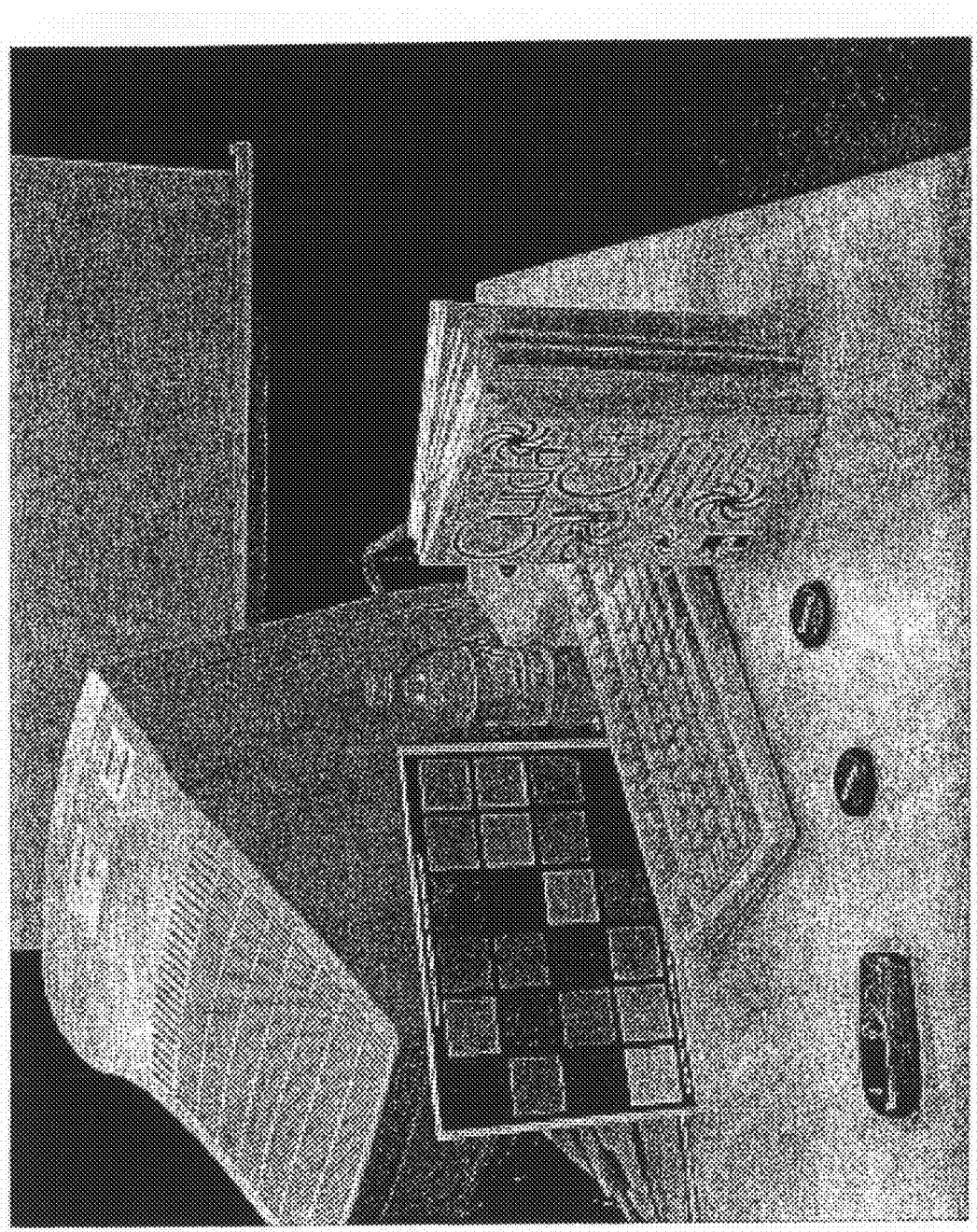

Some examples can be observed in FIGS. 4-9. FIGS. 4 and 5 contain a pair of frames of the same scene taken from different angles, for which the algorithm composing the invention has been applied.

Figure 6:
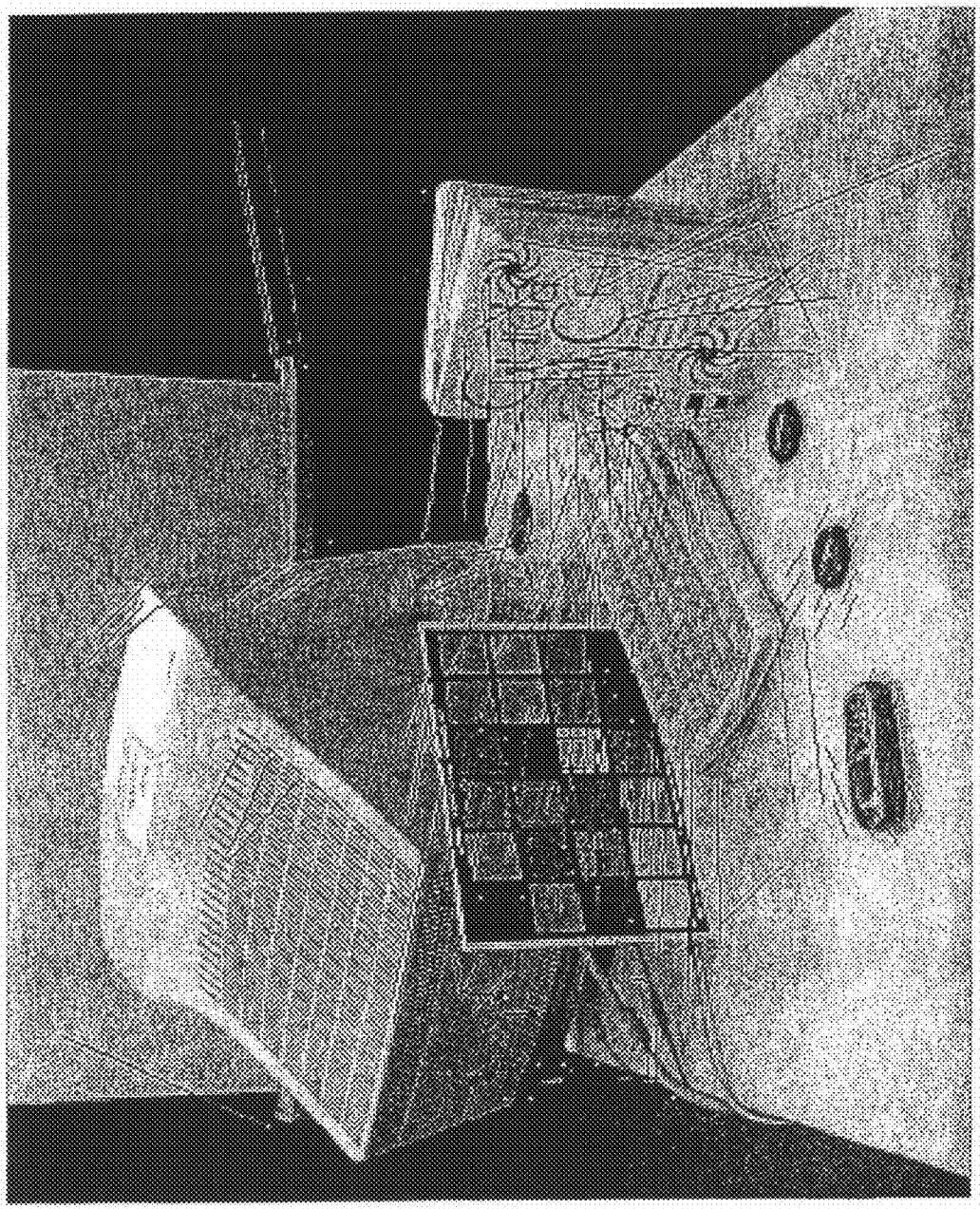
FIG. 6 shows the result of the KLT tracking technique carried out in the original way.
Figure 7:
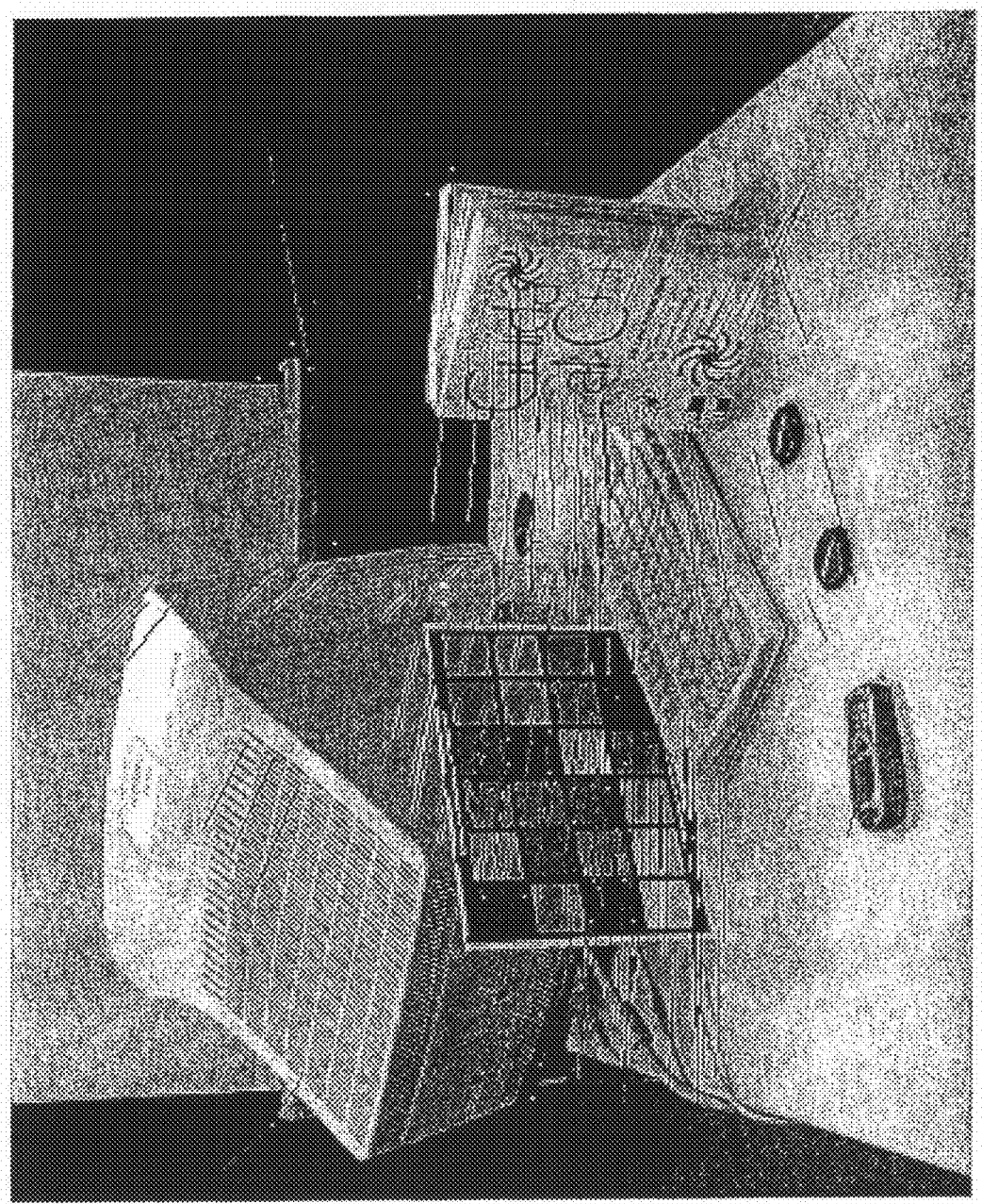
FIG. 7 shows the result obtained by means of the technique of the present invention.

FIG. 6 shows the result of the KLT tracking technique performed in the original way, while FIG. 7 shows the result obtained through the technique of the present invention. Both figures point out as segments the displacement vectors of the features chosen for tracking. As can be observed, in FIG. 7 the segments are mutually oriented much more coherently, this being an index of a lower presence of errors.

Figure 8B:
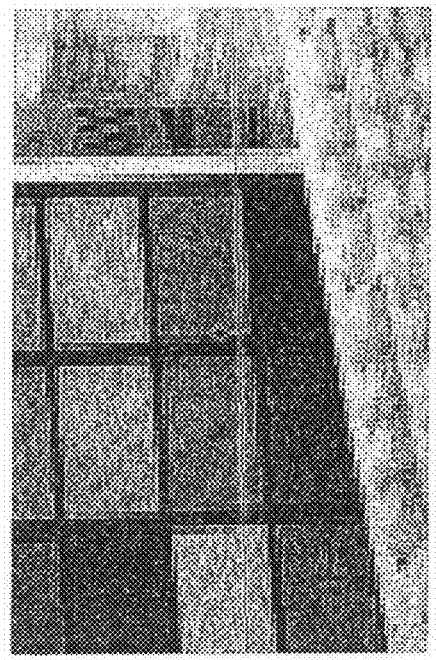
FIGS. 8 to 9 show comparative details of the results shown in FIGS. 6 and 7.
Figure 8C:
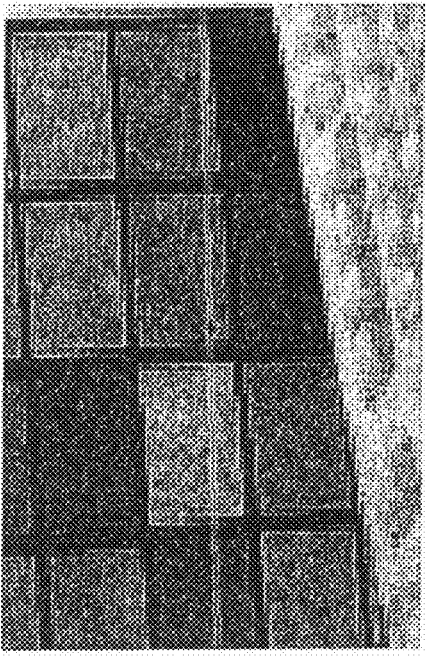
Figure 8A:
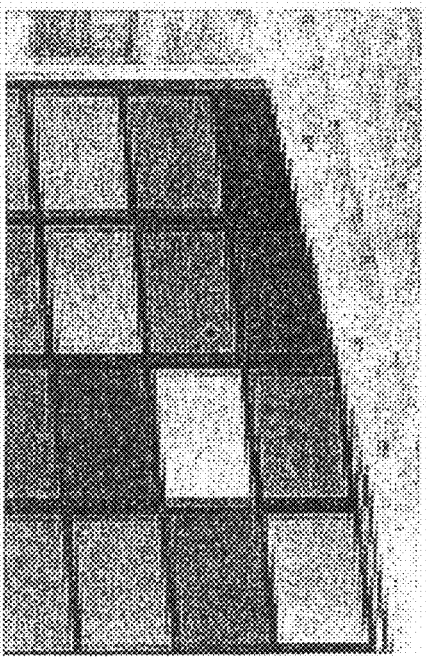
Figure 9A:
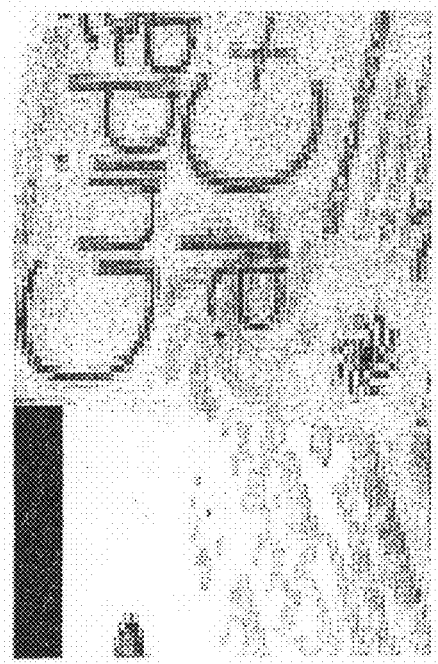
Figure 9B:
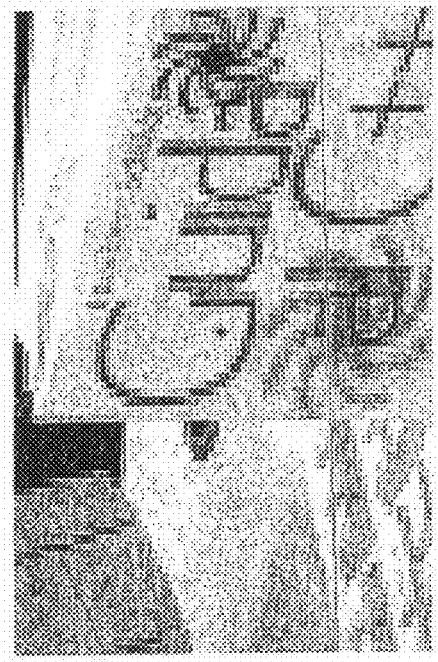
Figure 9C:
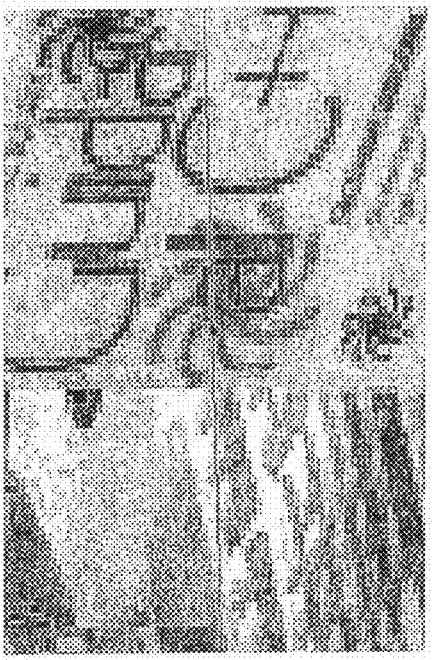

FIGS. 8 and 9 show some significant details in which the benefits given by the invention are more evident. In each one of these latter images, the top left box (8a, 9a) is centered on the feature extracted by the first frame; the top right box (8b, 9b) is centered on the point in the second frame obtained through the original KLT technique; the bottom right box (8c, 9c) is centered on the point in the second frame obtained through the present invention. In both right boxes, the epipolar straight line associated with the relevant feature is shown, which allows appreciating the strong improvement obtained.

The invention claimed is:

1. A method for determining scattered disparity fields in stereo vision, comprising the steps of:
capturing a first and a second image of a same scene from two different positions, so that at least one set of pixels of said first image is associated with a corresponding set of points on said second image;
selecting at least one pixel in said first image; and
determining a point of said second image associated with said pixel, wherein determining said point comprises minimising a cost function having as a variable a disparity vector between said pixel and said point and depending on a difference between the first and the second image in a window centered on said pixel and in a corresponding window centered on the point to be determined, said cost function comprising a term which depends in a monotonously increasing way on the distance of said point to be determined from an epipolar straight line in said second image associated with said pixel.

2. The method according to claim 1, wherein said first and second images are captured through a first camera and a second camera, respectively, and said term depends on calibration parameters of said first and second cameras.

3. The method according to claim 2, wherein said term is weighed depending on an uncertainty of camera calibration data.

4. The method according to claim 1, wherein said term is proportional to the square of the distance between said point and the epipolar line.

5. The method according to claim 1, wherein the step of determining the point of said second image associated with said pixel comprises delimiting in said second image an allowability area of said point around said epipolar straight line.

6. The method according to claim 5, wherein said allowability area is contained in a half plane delimited by a straight line perpendicular to said epipolar straight line.

7. The method according to claim 1, wherein said cost function comprises parameters comprised of brightness gradients in the pixels of said window centered on said pixel in said second image, and of brightness differences between pixels of said window centered on said pixel and pixels of said second image in the same window.

8. The method according to claim 1, wherein the step of determining the point of said second image associated with said pixel comprises associating a relative weight to all pixels contained in said window centered on said pixel.

9. The method according to claim 8, wherein the weight associated with pixels in a central area of said window centered on said pixel is greater than the weight associated with pixels in an external area of said window.

10. The method according to claim 1, wherein the step of determining said point comprises said step of minimising the cost function.

11. A system for stereo vision, comprising a first and a second shooting cameras adapted to shoot a same scene and a processing unit adapted to receive from said first and second cameras respective simultaneous images of said scene, said processing unit capable of being configured for:
capturing a first and a second image of a same scene from two different positions, so that at least one set of pixels of said first image is associated with a corresponding set of points on said second image;
selecting at least one pixel in said first image; and
determining a point of said second image associated with said pixel, wherein determining said point comprises minimizing a cost function having as a variable a disparity vector between said pixel and said point and depending on a difference between the first and the second image in a window centered on said pixel and in a corresponding window centered on the point to be determined, said cost function comprising a term which depends in a monotonously increasing way on the distance of said point to be determined from an epipolar straight line in said second image associated with said pixel.

* * * * *